(12) United States Patent
Yan

(10) Patent No.: US 12,472,736 B2
(45) Date of Patent: Nov. 18, 2025

(54) LAMINATOR CAPABLE OF OBTAINING ANTI-JAMMING FILM

(71) Applicant: Baofan Yan, Guangdong (CN)

(72) Inventor: Baofan Yan, Guangdong (CN)

(73) Assignee: Bonsen Electronics Limited, Guangdong (CN)

( * ) Notice: Subject to any disclaimer, the term of this patent is extended or adjusted under 35 U.S.C. 154(b) by 104 days.

(21) Appl. No.: 18/401,507

(22) Filed: Dec. 31, 2023

(65) Prior Publication Data

US 2025/0026118 A1 Jan. 23, 2025

(30) Foreign Application Priority Data

Jul. 19, 2023 (CN) .......................... 202321904228.4

(51) Int. Cl.
  *B32B 37/00* (2006.01)
  *B32B 37/06* (2006.01)
  *B32B 37/10* (2006.01)

(52) U.S. Cl.
  CPC .......... *B32B 37/0053* (2013.01); *B32B 37/06* (2013.01); *B32B 37/10* (2013.01)

(58) Field of Classification Search
  None
  See application file for complete search history.

(56) References Cited

U.S. PATENT DOCUMENTS

| | | |
|---|---|---|
| 11,077,649 B2 | 8/2021 | Song |
| 2021/0122149 A1* | 4/2021 | Song ................... B32B 37/0053 |
| 2023/0382093 A1 | 11/2023 | Lyu et al. |

FOREIGN PATENT DOCUMENTS

| | | |
|---|---|---|
| DE | 202011004252 U1 | 6/2011 |
| EP | 3015243 A1 | 5/2016 |
| TW | 201132486 A1 | 10/2011 |
| WO | WO2022089416 A1 | 5/2022 |

* cited by examiner

*Primary Examiner* — Christopher T Schatz

(57) ABSTRACT

A laminator contains: a case, a lamination element, and a motor. The lamination element includes a first shell, a second shell, a first roller, and a second roller. Each of the first shell and the second shell has a cavity, and a laminating channel is defined between the first shell and the second shell and passes through the lamination element. The cavity has at least one anti-jamming film structure horizontally passing through the opening thereof and configured to separate the opening from the laminating channel. An anti-jamming film conduit is defined between any two adjacent anti-jamming film structures and stacks in the laminating channel to prevent the film rolling into the cavity. The cavity has two limiting portions, and the anti-jamming film structure has multiple guide sheets. In addition, each of the first roller and the second roller has multiple slits.

12 Claims, 5 Drawing Sheets

LAMINATOR CAPABLE OF OBTAINING ANTI-JAMMING FILM

TECHNICAL FIELD

The present disclosure relates to laminating machine, and more particularly to a laminator which is capable of obtaining anti-jamming film.

BACKGROUND

A conventional lamination element of a laminator contains an anti-jamming film structure to avoid the film rolling into a cavity of two rollers. The anti-jamming film structure is rolled by steel wires, and two wire rods are fixed on two side of the cavity of the roller, wherein multiple steel wires are rolled on the two wire rods to form multiple wire sections. In assembly, each wire section is engaged into a respective one slit of a first roller or a second roller in high connection accuracy. However, the wire sections are not easy to align with the corresponding slits, thus causing troublesome assembly and poor production efficiency. In addition, the wire sections will damage the first roller or the second roller often.

The present invention has arisen to mitigate and/or obviate the afore-described disadvantages.

SUMMARY

A primary aspect of the present invention is to provide a laminator which is capable of obtaining anti-jamming film by using a lamination element and easy assembly to enhance a production efficiency and reduce a production cost.

To obtain above-mentioned aspect, a laminator capable of obtaining anti-jamming film provided by the present invention contains: a case, a lamination element, and a motor.

The lamination element and the motor are received in an accommodation room of the case, and the lamination element includes a first shell, a second shell, a first roller, and a second roller. Each of the first shell and the second shell has a cavity axially extending in a middle portion of the first shell and the second shell so that the first roller is rotatably received in the cavity of the first shell and the second roller is rotatably accommodated in the cavity of the second shell, the first roller and the second roller are configured to rotatably press and roll the film, the motor is electrically connected with the first roller and the second roller, and a laminating channel is defined between the first shell and the second shell and passes through the lamination element.

The cavity has the at least one anti-jamming film structure horizontally passing through the opening of the inner wall thereof and configured to separate the opening from the laminating channel, wherein an anti-jamming film conduit is defined between any two adjacent anti-jamming film structures and stacks in the laminating channel to prevent the film rolling into the cavity.

The cavity has two limiting portions axially extending from two sides of a front end and a rear end of the cavity, and the anti-jamming film structure has multiple guide sheets which are axially spaced from one another, two ends of a respective one guide sheet are movably received in a respective one limiting portion of the cavity, and a middle portion of the respective one guide sheet projects out of the opening of the inner wall of the cavity.

Each of the first roller and the second roller has multiple slits surrounding the first roller or the second roller, and the middle portion of the respective one guide sheet is movably engaged in a respective one slit.

Thereby, the laminator of the present invention contains advantages as follows:

The laminator includes two limiting portions axially extending from two sides of the first roller or the second roller so that the two ends of a respective one guide sheet are movably received in a respective one limiting portion of the cavity, thus accelerating connecting process and reducing assembly difficult. Also, it is easy, convenient, and efficient to enhance assembly and production efficiency, and to simplify the lamination element.

Other objects and features will be in part apparent and in part pointed out hereinafter.

DETAILED DESCRIPTION

Figure 1:
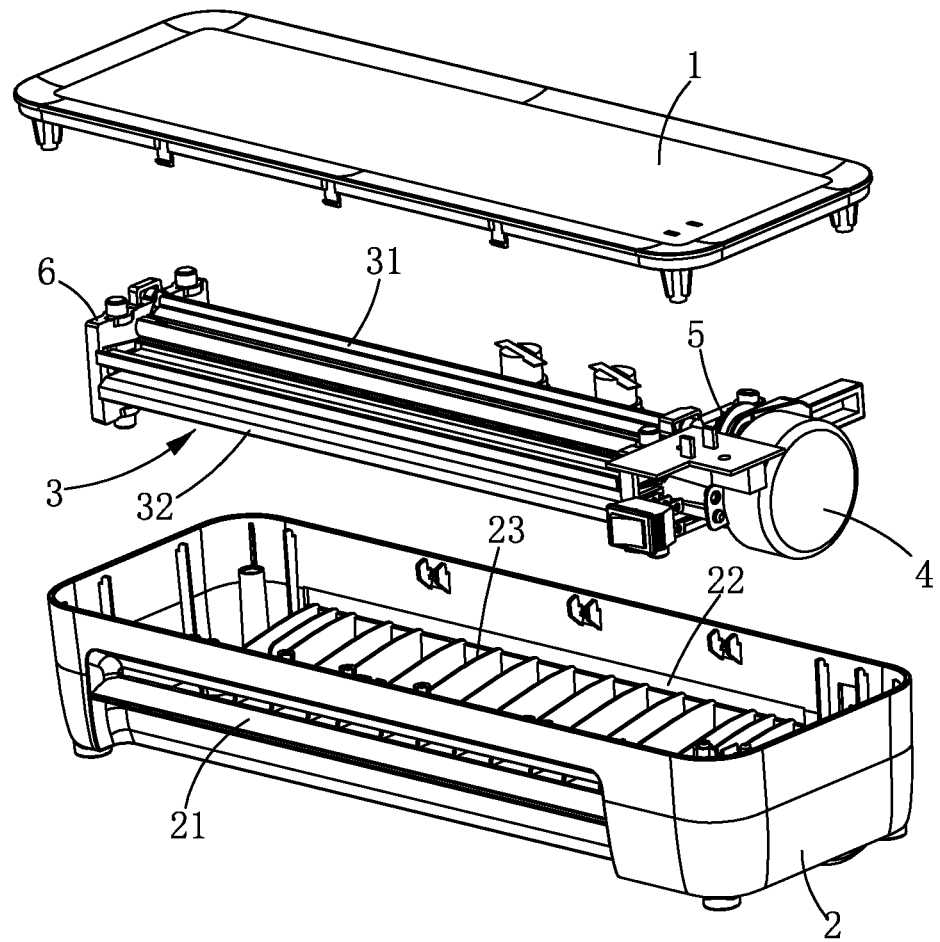
FIG. 1 is a perspective view showing the exploded components of a laminator according to a preferred embodiment of the present invention.
Figure 2:
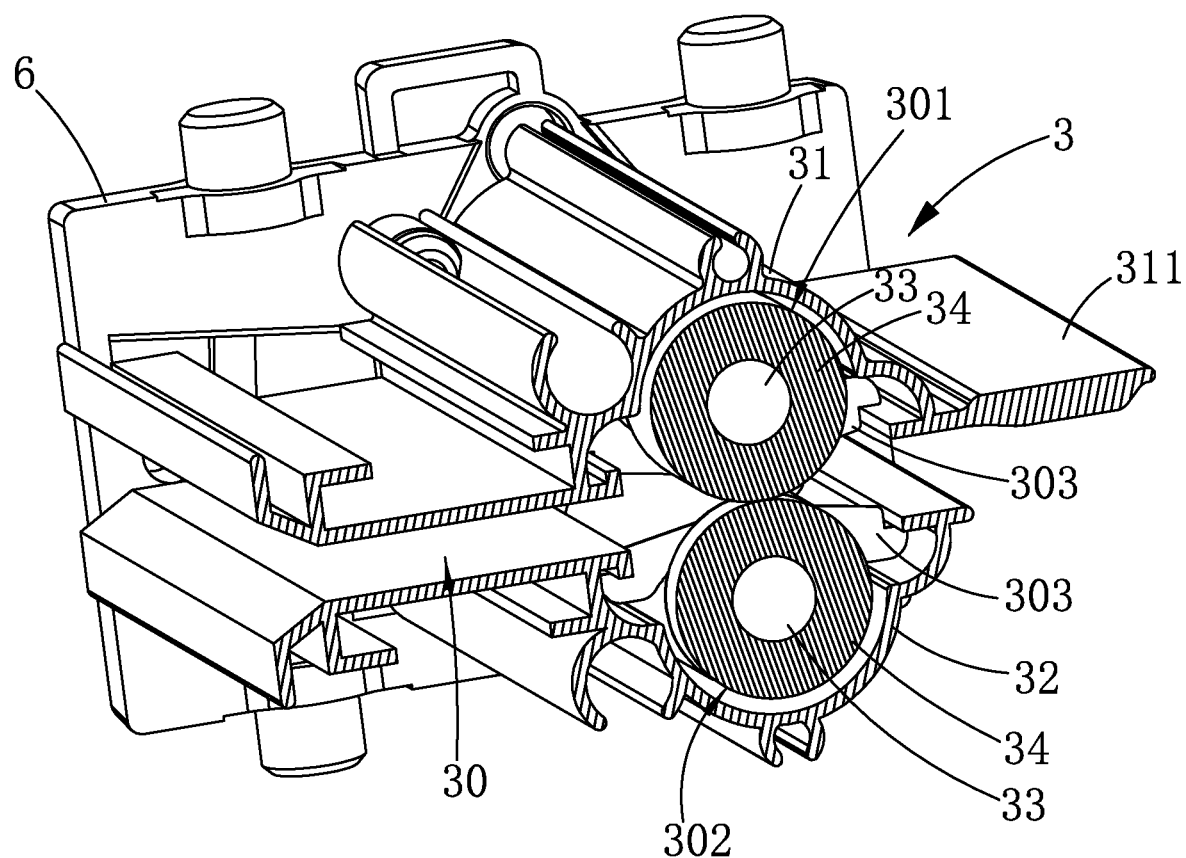
FIG. 2 is a cross-sectional perspective view showing the assembly of the laminator according to the preferred embodiment of the present invention.

With reference to FIGS. 1-5, a laminator capable of obtaining anti-jamming film according to a preferred embodiment of the present invention comprises: a case 1, a lamination element 3, and a motor 4. The lamination element 3 and the motor 4 are received in an accommodation room of the case 1. The lamination element 3 includes a first shell 31, a second shell 32, a first roller 301, and a second roller 302, wherein each of the first shell 31 and the second shell 32 has a cavity 310 axially extending in a middle portion of the first shell 31 and the second shell 32 so that the first roller 301 is rotatably received in the cavity 310 of the first shell 31 and the second roller 302 is rotatably accommodated in the cavity 310 of the second shell 32. The first roller 301 and the second roller 302 are configured to rotatably press and roll the film. The motor 4 is electrically connected with the first roller 301 and the second roller 302, and a laminating channel is defined between the first shell 31 and the second shell 32 and passes through the lamination element 3.

The case 1 includes a top lid 1 and a bottom lid 2, the top lid 1 is covered on a top of the bottom lid 2, the bottom lid 2 includes a glue inlet 21 defined on a front side thereof, and the bottom lid 2 also includes a glue outlet 22 formed on a rear side thereof. The lamination element 3 includes two side plates 6 mounted on two sides of the first shell 31, and two sides of the second shell 32 are connected on the two side plates 6, wherein a front end of the laminating channel is connected with the glue outlet 22, and a rear end of the laminating channel is connected with the glue outlet 22. At least one anti-jamming film structure is located on an opening of an inner wall of the cavity 310 so that an anti-jamming channel stacks with the laminating channel, and the cavity 310 is separated from the laminating channel.

Two ends of the first roller 301 and two ends of the second roller 302 are rotatably connected with the two side plates 6, the motor 4 is disposed on an outer walls of one side plate 6 on which a gear box 5 is mounted, the gear box 5 is connected with the motor 4, the first roller 301 and the second roller 302 in a gear driving manner.

The cavity 310 has the at least one anti-jamming film structure horizontally passing through the opening of the inner wall thereof and configured to separate the opening from the laminating channel, wherein an anti-jamming film conduit is defined between any two adjacent anti-jamming film structures and stacks in the laminating channel to prevent the film rolling into the cavity 310. The cavity 310 has two limiting portions 3101 axially extending from two sides of a front end and a rear end of the cavity 310, wherein the anti-jamming film structure has multiple guide sheets 303 which are axially spaced from one another, two ends of a respective one guide sheet 303 are movably received in a respective one limiting portion 3101 of the cavity 310, a middle portion of the respective one guide sheet 303 projects out of the opening of the inner wall of the cavity 310. Each of the first roller 301 and the second roller 302 has multiple slits 300 surrounding the first roller 301 or the second roller 302, wherein the middle portion of the respective one guide sheet 303 is movably engaged in a respective one slit 300.

The multiple guide sheets 303 are arranged parallelly and are perpendicular to a central axis of the first roller 301 or the second roller 302, wherein two sides of a front end and a rear end of any one guide sheet 303 below the cavity 310 of the first shell 31 are connected with inner walls of two sides of a front end and a rear end of the cavity 310 of the first shell 31, and two sides of a front end and a rear end of any one guide sheet 303 above the cavity 310 of the second shell 32 are connected with inner walls of two sides of a front end and a rear end of the cavity 310 of the second shell 32. The first roller 301 or the second roller 302 has a rotary shaft 33 and a rolling element 34 fixed on an outer wall of the rotary shaft 33, wherein an outer circumference of the rolling element 34 is a rolling surface, and the respective one slit 300 extends below a middle portion of the rolling element 34 from the rolling surface of the rolling element 34.

The cavity 310 is communicated with the respective one limiting portion 3101, the respective one guide sheet 303 has two defining portions 3031 formed on two sides thereof, wherein a shape of a respective one defining portion 3031 is identical to a shape of a cross section of the respective one limiting portion 3101, and the respective one defining portion 3031 of the respective one guide sheet 303 extends into and is received in the respective one limiting portion 3101, wherein a middle portion of the respective one guide sheet 303 is narrow, projects to a central portion of the laminating channel, and is movably inserted into the respective one slit 300. A top of the respective one guide sheet 303 is lower than a guiding bridge. A shape of the respective one guide sheet 303 is in an arch bridge shape, and the guiding bridge of the respective one guide sheet 303 is one-piece connected with the respective one defining portion 3031 of the respective one guide sheet 303, wherein the guiding bridge of the respective one guide sheet 303 has an arcuate portion formed on a top thereof and has a recess 3034 defined on a bottom of the guiding bridge, a middle portion of the guiding bridge of the respective one guide sheet 303 is movably engaged in the respective one slit 300 of the first roller 301 or the second roller 302, and a periphery of the guiding bridge is not higher than a rolling surface of the first roller 301 or the second roller 302.

In operation, the film is delivered to the first roller 301 or the second roller 302 from the glue inlet 21 to be hot rolled so that the film is wrinkled at a raising temperature. The first shell 31 and the second shell 32 are made of metal, and each of the first shell 31 and the second shell 32 has a preheating plate 312 which is made of metal and is one-piece formed on a front end of the first shell 31 and the second shell 32, wherein an inner wall of the preheating plate 312 is a plane and is configured to maintain a front portion of the laminating channel in a temperature of 60° C. to 80° C., when the film passes through an area of the laminating channel corresponding to the preheating plate 312, the film is preheated by the preheating plate 312 to avoid laminating wrinkle.

The preheating plate 312 extends into the cavity 310 of the second shell 32 along the laminating channel, the guiding bridge of the respective one guide sheet 303 obliquely extends to the rolling surface of the top of the second roller 302 along a peripheral side of the preheating plate 312 and is inserted into the second roller 302, wherein the guiding bridge of the respective one guide sheet 303 has a tilted conduct face configured to guide the film to a rolling contact surface of the first roller 301 and the second roller 302, such that the film is guided to the rolling contact surface of the first roller 301 and the second roller 302, thus avoiding the film rolling into the cavity 310.

A gluing guide structure 23 is formed close to the glue outlet 22, and the gluing structure 23 includes multiple guide fins which are separately arranged along the glue outlet 22 and are aligned with one another. The first shell 31 has a stop piece 311 fixed on a rear end thereof and configured to support pictures or files which are glued so that the pictures and the files are cooled slowly to avoid a deformation.

In assembly, the respective one guide sheet 303 is engaged in the respective one slit 300, and a gluing roller of the respective one guide sheet 303 is received in the cavity 300, such that the respective one defining portion 3031 of the respective one guide sheet 303 is accommodated in the respective one limiting portion 3101, thus connecting the first roller 301, the second roller 302, and the respective one guide sheet 303. Preferably, the lamination element 3 is connected easily, conveniently, and quickly by eliminating a pre-connection of the respective one guide sheet and a steel wire rod, thus accelerating connection, reducing labor cost, and enhancing production efficiency.

A thickness of the respective one guide sheet 303 is within 0.5 mm to 3 mm, a peripheral side of the middle portion of the guiding bridge is within 1 mm to 2 mm lower than the rolling surface of the first roller 301 or the second roller 302. A width of the respective one slit 300 is greater than a thickness of the respective one guide sheet 303, wherein a condition of a difference value a between the width of the respective one slit 300 and the thickness of the respective one guide sheet 303 is 0.1 mm≤a≤0.5 mm. Preferably, the difference value a between the width of the respective one slit 300 and the thickness of the respective one guide sheet 303 is set to 0.2 mm, such that the first roller 301 and the second roller 302 rotate smoothly to avoid a cutting between the rolling surface of the first roller 301 or the second roller 302 and the respective one guide sheet 303, thus obtaining a completion of laminating glue.

Figure 4:
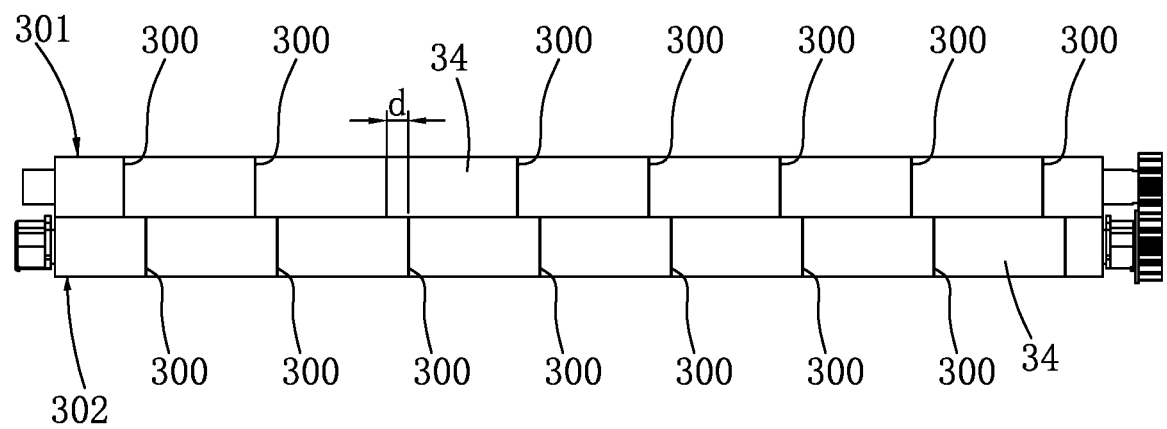
FIG. 4 is a side plan showing the operation of the first roller and the second roller of the laminator according to the preferred embodiment of the present invention.
Figure 5:
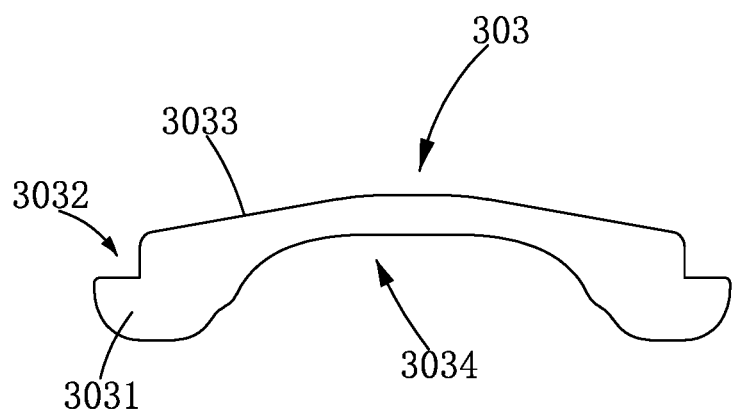
FIG. 5 is a side plan showing the assembly of a respective one guide sheet of the laminator according to the preferred embodiment of the present invention.

Referring to FIG. 4, the respective one slit 300 of the first roller 301 is staggered with the respective one slit 300 of the second roller 302 along an axial direction, wherein a condition of a distance d between any two adjacent slits 300 along the axial direction is 0.5 cm≤d≤1.5 cm. Preferably, the distance d between any two adjacent slits 300 is 1 cm so as to evenly distribute a reaction force of the at least one anti-jamming film structure to avoid jamming the film, reduce an indentation of the film pressed by the respective one guide sheet 303, and enhance laminating quality.

Figure 3:
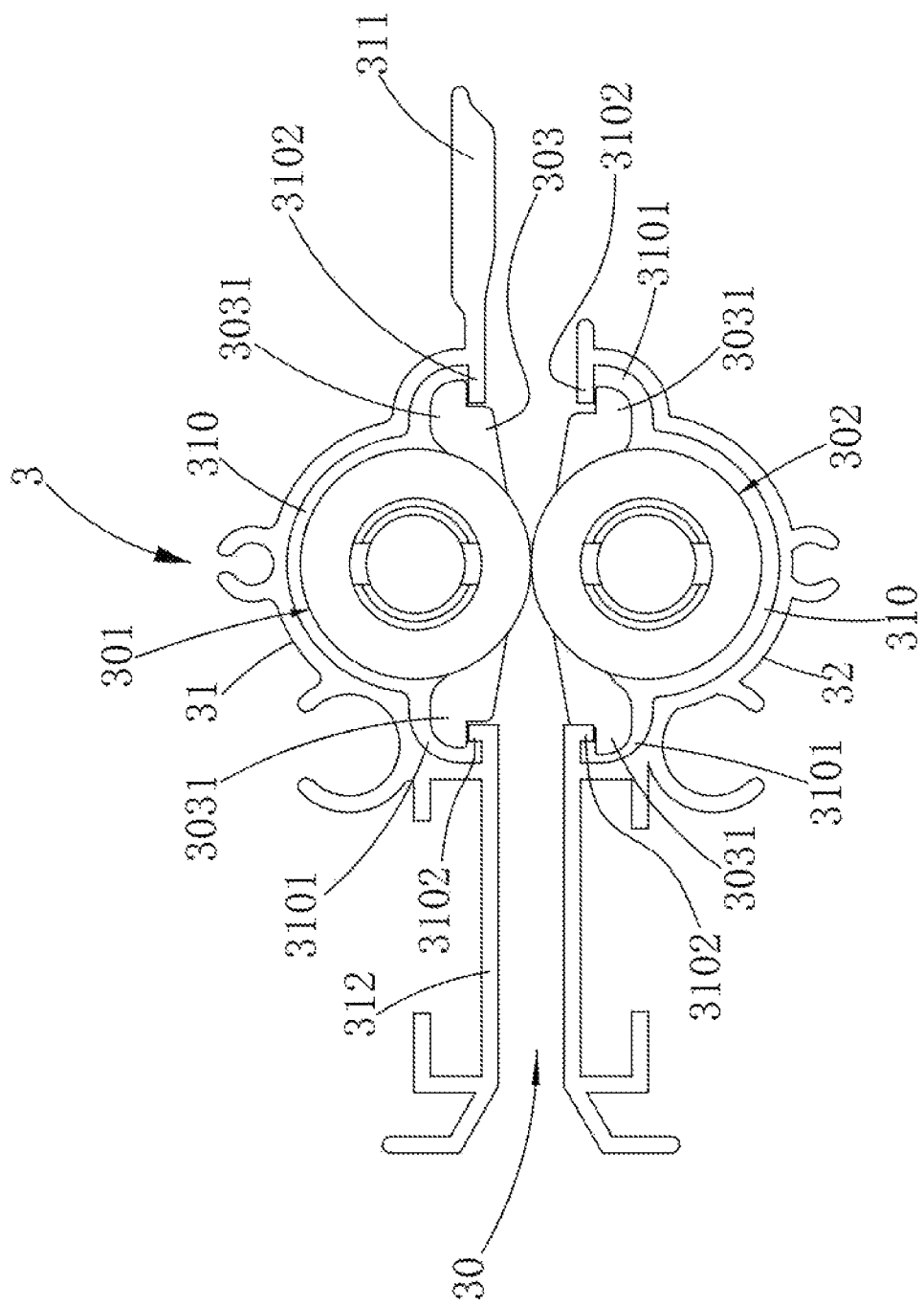
FIG. 3 is a side plan view showing the assembly of the laminator according to the preferred embodiment of the present invention.

Each of two sides of a top of the guiding bridge include a conducting fringe 3033, and the conducting fringe 3033 has an arc-shaped section or a linear section, wherein two ends of the conducting fringe 3033 are connected with two sides of the opening of the cavity 310. The respective one limiting portion 3101 has a fixing shoulder 3102 horizontally extending from a bottom thereof, and the respective one limiting portion 3101 has a cutout 3032 for mating with the fixing shoulder 3102. After connecting the respective one guide sheet 303, the two ends of the conducting fringe 3033 are connected with the two sides of the opening of the cavity 310. As shown in FIG. 3, an end of the conducting fringe 3033 close to the glue inlet 21 is lower than an inner wall of the opening of the cavity 310, and the other end of the conducting fringe 3033 close to the glue outlet 22 is higher than the inner wall of the opening of the cavity 310, such that the film is delivered through the first roller 301 and the second roller 302 along a rolling delivery direction to avoid being jammed and to operate the lamination element 3 stably.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A laminator capable of obtaining anti-jamming film comprising:
   a case (1), a lamination element (3), and a motor (4);
   the lamination element (3) and the motor (4) are received in an accommodation room of the case (1), the lamination element (3) includes a first shell (31), a second shell (32), a first roller (301), and a second roller (302), wherein each of the first shell (31) and the second shell (32) has a cavity (310) axially extending in a middle portion of the first shell (31) and the second shell (32) so that the first roller (301) is rotatably received in the cavity (310) of the first shell (31) and the second roller (302) is rotatably accommodated in the cavity (310) of the second shell (32), the first roller (301) and the second roller (302) are configured to rotatably press and roll the film, the motor (4) is electrically connected with the first roller (301) and the second roller (302), and a laminating channel is defined between the first shell (31) and the second shell (32) and passes through the lamination element (3);
   wherein each cavity (310) has at least one anti-jamming film structure horizontally passing through an opening of an inner wall thereof and configured to separate each opening from the laminating channel, wherein an anti-jamming film conduit is defined between any two adjacent anti-jamming film structures and stacks in the laminating channel to prevent the film rolling into the cavity (310);
   wherein each cavity (310) has two limiting portions (3101) axially extending from two sides of a front end and a rear end of each cavity (310), wherein the anti-jamming film structures have multiple guide sheets (303) which are axially spaced from one another, two ends of a respective one guide sheet (303) of the multiple respective guide sheets of each anti-jamming film structure are movably received in a respective one limiting portion (3101) of the limiting portions of each cavity (310), and a middle portion of the respective one guide sheet (303) projects out of each opening of each respective inner wall of each respective cavity (310); and
   wherein each of the first roller (301) and the second roller (302) has multiple slits (300) surrounding the first roller (301) or the second roller (302), and the middle portion of the respective one guide sheet (303) is movably engaged in a respective one slit (300).

2. The laminator as claimed in claim 1, wherein each respective one guide sheets (303) is perpendicular to a central axis of the first roller (301) or the second roller (302), wherein two sides of a front end and a rear end of any one guide sheet (303) of the multiple guide sheets (303) below the cavity (310) of the first shell (31) are connected with inner walls of two sides of a front end and a rear end of the cavity (310) of the first shell (31), and two sides of a front end and a rear end of any one guide sheet of the multiple guide sheets (303) above the cavity (310) of the second shell (32) are connected with inner walls of two sides of a front end and a rear end of the cavity (310) of the second shell (32); the first roller (301) or the second roller (302) has a rotary shaft (33) and a rolling element (34) fixed on an outer wall of the rotary shaft (33), wherein an outer circumference of the rolling element (34) is a rolling surface, and the respective one slit (300) extends below a middle portion of the rolling element (34) from the rolling surface of the rolling element (34).

3. The laminator as claimed in claim 2, wherein each cavity (310) is communicated with each respective one limiting portion (3101), each respective one guide sheet (303) has two defining portions (3031) formed on two sides thereof, wherein a shape of a each respective one defining portion (3031) is identical to a shape of a cross section of each respective one limiting portion (3101), and each respective one defining portion (3031) of each respective one guide sheet (303) extends into and is received in each respective one limiting portion (3101), wherein a middle portion of each respective one guide sheet (303) is narrow, projects to a central portion of the laminating channel, and is movably inserted into each respective one slit (300), wherein a top of each respective one guide sheet (303) is lower than a guiding bridge.

4. The laminator as claimed in claim 3, wherein each of the first shell (31) and the second shell (32) has a preheating plate (312) which is one-piece formed on a front end of the first shell (31) and the second shell (32), the preheating plate (312) of the second shell extends into the cavity (310) of the second shell (32) along the laminating channel, the guiding bridge of the respective one guide sheet (303) obliquely extends to the rolling surface of a top of the second roller (302) along a peripheral side of the second shell preheating plate (312) and is inserted into the second roller (302), wherein each guiding bridge of each respective one guide sheet (303) has a tilted conduct face configured to guide the film to a rolling contact surface of the first roller (301) and the second roller (302).

5. The laminator as claimed in claim 3, wherein the case (1) includes a top lid (1) and a bottom lid (2), the top lid (1) is covered on a top of the bottom lid (2), the bottom lid (2) includes a glue inlet (21) defined on a front side thereof, and the bottom lid (2) also includes a glue outlet (22) formed on a rear side thereof; the lamination element (3) includes two side plates (6) mounted on two sides of the first shell (31), and two sides of the second shell (32) are connected on the two side plates (6), wherein a front end of the laminating channel is connected with the glue inlet (21), and a rear end of the laminating channel is connected with the glue outlet (22);

at least one of the respective anti-jamming film structures is located on an opening of the respective inner wall of the corresponding respective cavity (310) so that anti-jamming channel stacks with the laminating channel, and each cavity (310) is separated from the laminating channel;

two ends of the first roller (301) and two ends of the second roller (302) are rotatably connected with the two side plates (6), the motor (4) is disposed on an outer walls of one side plate (6) on which a gear box (5) is mounted, the gear box (5) is connected with the motor (4), the first roller (301) and the second roller (302) in a gear driving manner.

6. The laminator as claimed in claim 3, wherein a shape of the respective one guide sheet (303) is in an arch bridge shape, and two ends of the guiding bridge of the respective one guide sheet (303) are one-piece connected with the respective one defining portion (3031) of the respective one guide sheet (303), wherein the guiding bridge of the respective one guide sheet (303) has an arcuate portion formed on a top thereof and has a recess (3034) defined on a bottom of the guiding bridge, a middle portion of the guiding bridge of the respective one guide sheet (303) is movably engaged in the respective one slit (300) of the first roller (301) or the second roller (302), and a periphery of the guiding bridge is not higher than a rolling surface of the first roller (301) or the second roller (302).

7. The laminator as claimed in claim 6, wherein each of two sides of the respective top of the guiding bridge includes a conducting fringe (3033), and each respective conducting fringe (3033) has an arc-shaped section or a linear section; wherein two ends of the conducting fringe (3033) are connected with each of the two sides of each respective opening of each respective cavity (310).

8. The laminator as claimed in claim 7, wherein the respective one limiting portion (3101) has a fixing shoulder (3102) horizontally extending from a bottom thereof; and the respective one limiting portion (3101) has a cutout (3032) for mating with the fixing shoulder (3102).

9. The laminator as claimed in claim 6, wherein a width of the respective one slit (300) is greater than a thickness of the respective one guide sheet (303), wherein a difference value a between the width of the respective one slit (300) and the thickness of the respective one guide sheet (303) is 0.1 mm≤a≤0.5 mm.

10. The laminator as claimed in claim 6, wherein a thickness of the respective one guide sheet (303) is within 0.5 mm to 3 mm, and a peripheral side of the middle portion of the respective guiding bridge is within 1 mm to 2 mm lower than the rolling surface of the first roller (301) or the second roller (302).

11. The laminator as claimed in claim 5, wherein the respective one slit (300) of the first roller (301) is staggered with the respective one slit (300) of the second roller (302) along an axial direction, and a distance d between any two adjacent slits (300) of the slits along the axial direction is 0.5 cm≤d≤1.5 cm.

12. The laminator as claimed in claim 6, wherein a gluing guide structure (23) is formed close to a glue outlet (22), and the gluing guide structure (23) includes multiple guide fins which are separately arranged along the glue outlet (22) and are aligned with one another; the first shell (31) has a stop piece (311) fixed on the rear end thereof.

* * * * *